United States Patent [19]

Mishima

[11] Patent Number: 4,501,984
[45] Date of Patent: Feb. 26, 1985

[54] COLUMNAR SOLID BODY ROTOR

[75] Inventor: Matsuo Mishima, Tokyo, Japan

[73] Assignee: Micro Technology Laboratory Co., Ltd., Japan

[21] Appl. No.: 561,649

[22] Filed: Dec. 15, 1983

Related U.S. Application Data

[63] Continuation of Ser. No. 259,430, May 1, 1981, abandoned, which is a continuation of Ser. No. 929,963, Aug. 1, 1978, abandoned.

[30] Foreign Application Priority Data

Aug. 3, 1977 [JP] Japan ................................. 52-93557
Nov. 17, 1977 [JP] Japan ............................... 52-138216

[51] Int. Cl.$^3$ ............................................. H02K 1/22
[52] U.S. Cl. ...................................... 310/261; 310/43; 310/44
[58] Field of Search ................................. 310/42–44, 310/261, 264, 265

[56] References Cited

U.S. PATENT DOCUMENTS

| | | | |
|---|---|---|---|
| 2,134,795 | 11/1938 | Myers | 310/44 X |
| 2,361,748 | 10/1944 | Daiger et al. | 310/261 |
| 2,450,982 | 10/1948 | O'Brien | 310/44 X |
| 2,548,133 | 4/1951 | Treat | 310/43 |
| 3,173,194 | 3/1965 | Applegate | 310/43 X |
| 3,891,876 | 6/1975 | Herr et al. | 310/43 |

*Primary Examiner*—Mark O. Budd
*Attorney, Agent, or Firm*—Ostrolenk, Faber, Gerb & Soffen

[57] ABSTRACT

A columnar solid body rotor for DC dynamo electric machines in which a cylindrical dust core, obtained by solidifying a finely powdered magnetic material with an insulating material such as a synthetic resin or the like is mounted on the rotor shaft and a closely wound winding is disposed on the outer periphery of the dust core. The volume-conversion permeability of the rotor is selected several times higher than the space permeability, thereby to increase the effective flux of the rotor.

6 Claims, 6 Drawing Figures

COLUMNAR SOLID BODY ROTOR

This is a continuation of application Ser. No. 259,430, filed May 1, 1981, now abandoned which is in turn a continuation of application Ser. No. 929,963, filed Aug. 1, 1978 (now abandoned).

BACKGROUND OF THE INVENTION

1. Field of the Invention

This invention relates to a columnar solid body rotor, and more particularly to a columnar solid body rotor for DC dynamo electric machines in which a closely stacked winding is mounted on the outer periphery of a dust core.

2. Description of the Prior Art

A method that has heretofore been employed for increasing the output of a DC motor, in particular, a DC servo motor, and for enhancement of its control function is to increase the current density of the rotor winding to raise the upper limit of temperature, or to effect forced cooling. If, however, it is possible to produce a rotor which is small in inertia, extremely small in the loss of the speed function and mechanically rigid, the motor output can be increased by a high-speed rotation.

Incidentally, as the iron loss, especially the eddy-current loss, which is attendant with the high-speed rotation, increases in proportion to the square of a rotating magnetization frequency, a rotor using a laminated iron core of silicon iron, a magnetic alloy or the like suffers excessive iron losses, and accordingly it is difficult to increase the output by the high-speed rotation. On the other hand, a coreless rotor is free from iron losses, so that an increase in the output by the high-speed rotation is possible.

Coreless rotors heretofore employed in DC motors may be of two types, one of which is a disc-shaped rotor formed with a disc-shaped printed circuit or a punched copper plate or a winding formed into a disc-shape, whereas the other is a cup-shaped rotor arranged such that a single-layer or multi-layer winding is formed into a cup-shape.

However, the disc-shaped rotor formed with the printed circuit or punched copper plate has a small torque factor and a relatively large moment of inertia owing to its construction. Since the rotor of the type that a winding is formed into a disc-shape is large in the moment of inertia and, by nature, low in the torque-inertia ratio, its kinetic energy due to a high-speed rotation is very large, which leads to the generation of distortion and vibration. Therefore, any of the disc-shaped rotors as mentioned above are not suitable for the high-speed operation. On the other hand, the cup-shaped rotor has a limit in its field flux density, so that in the case where it is designed for a high output, the volume of the winding is increased which inevitably increases the diameter and thickness of the cup structure to cause an increase in the moment of inertia of the rotor. As a consequence, the torque-inertia ratio of the rotor tends to decrease with an increase in its output rating.

Further, the rotor shaft and the cup-shaped winding are mechanically coupled with each other in a cantilever fashion such that the cup-shaped winding is affixed at its bottom, i.e. at one end in its axial direction, to the rotor shaft. Accordingly, in the case of high-speed rotation or when applied an impulsive input, the cup-shaped winding and its fixed portion are physically distorted or deformed which may lead to breakdown of the rotor itself in some cases.

In view of the above, the present inventor has previously proposed a columnar solid body coreless rotor whose volume is almost occupied by a winding and a stator for a DC dynamo electric machine in which intense magnetic field poles are disposed on the outside of the rotor to provide a highly efficient magnetic field path which blocks an excessive leakage flux inevitably occurring in a magnetic field path of a large air gap length.

The abovesaid columnar solid body coreless rotor is such as shown in FIG. 1 in which a sleeve-like insulator 16 is disposed around a rotor shaft 11 and a closely wound rotor winding 15 is mounted on the outer periphery of the insulator 16. Reference numeral 14 indicates spacers. This rotor is a rod-like one whose volume is almost occupied by the winding. Accordingly, the volume of the winding is large, which offers the advantages that the rotor is low in inductance, mechanically very rigid and small in inertia. Moreover, the rotor exhibits excellent control performance and is excellent in commutation because of its low inductance property, and in addition, since the rotor is small in inertia and very rigid mechanically, it has the performance that withstands a high-speed rotation of 20,000 to 40,000 rpm, for instance, and an impulsive input. The performance of the rotor will hereinbelow be described.

The torque which is produced by the rotor of a DC dynamo electric machine is as follows: Let l, r, B and i represent the length [cm] of each conductor in its axial direction, the radius [cm] of the conductor at its center, the flux density [gauss] of an air gap and a conductor current [A], respectively, and let it be assumed that the number of poles is two and that the number of parallel circuits in the rotor is two. In the following the cgs unit will be used in consideration of measured values described later on. The force f generated by the conductor is that $f = Bl(i/10)$[dyne], and accordingly the turning force $\tau$ is that $\tau = fr = Bl(i/10)r$[dyne−cm]. Letting Z represent the total number of conductors, the number of conductors included in an angle $d\theta$ is $$\frac{Z}{2\pi} d\theta$$

and the turning force acting on this portion is $$d\tau = \tau \frac{Z}{2\pi} d\theta = \frac{BilrZ}{10 \times 2\pi} d\theta.$$

Accordingly, the total turning force is given as follows:

$$T = \int_0^{2\pi} d\tau = \int_0^{2\pi} Blrd\theta \times \frac{iZ}{10 \times 2\pi} \quad (1)$$

$Blrd\theta$ corresponds to the number of positive and negative fluxes of each pole, that is, twice of the flux $\Phi$ of the rotor in this case, so that if a rotor current is taken as Ia, it follows that $$i = \frac{Ia}{2\pi}.$$

Accordingly, equation (1) becomes as follows:

$$T = \frac{Z\Phi}{2\pi} \times \frac{Ia}{10} \text{ [dyne − cm]} \qquad (2)$$

Thus, the torque generated by the rotor is obtained which is given by equation (2). If the number of revolutions of the rotor per second is taken as n[rps], the power generated by the rotor, that is, its output Po is expressed by the following equation:

$$Po = 2\pi n T \times 10^{-7} [W] \qquad (3).$$

Substituting T of equation (2) in equation (3), it follows that $$Po = nZ\Phi Ia \times 10^{-8} [W] \qquad (4).$$

Since the output by equation (4) is obtained by substituting the generated torque of equation (2), it includes a loss torque Tl which is the sum total of mechanical losses by bearings and a brush and wind losses and, in the case of a core being used, iron loss; namely, (T−Tl) is the axis transmission torque. Accordingly, a true output Pe is as follows:

$$Pe = 2\pi n (T − Tl) \times 10^{-7} [W] \qquad (5).$$

It appears from the above that, according to equation (4), the output of the abovesaid columnar solid body coreless rotor proposed previously by the present inventor is in proportion to the rotor effective flux Φ, the rotor speed n and the rotor current Ia.

Since the product of the conductor number Z and the rotor current Ia depends upon the volume of the rotor winding and the upper limit of a permissible temperature rise of the winding, the rotor output can be enhanced by increasing the effective flux Φ and the speed n of the rotor. It is also evident from the general formula of the starting time constant that an increase in the effective flux of the rotor provides for enhanced control performance.

Further, as the columnar solid body coreless rotor is capable of high-speed rotation which is unobtainable with the conventional coreless rotors as mentioned previously, the speed n has already reached substantially a desired value. If the effective flux of the rotor can be increased without a sacrifice of the requirements for the high-speed rotation, it is possible to provide for enhanced output and control performance of the rotor. However, if the flux density of the magnetic field poles disposed on the outside of the columnar solid body coreless rotor is raised twice, the leakage flux of the magnetic field path also increases with an increase in the flux density between the poles in the case of a magnetic field by permanent magnets, so that a required length of each permanent magnet in a closed curve of the magnetic field path becomes twice or more the cross-sectional area of the magnet also increases. As a consequence, the configuration of the magnetic field path becomes several times larger to degrade the configuration-output ratio, and an increase in the number of permanent magnets used leads to raised manufacturing cost, which causes a bottleneck in wide application of the rotor.

However, since the columnar solid body coreless rotor is non-magnetic, its space permeability is that $\mu_0 = 1$. If the volume-conversion permeability (the permeability of the rotor as a whole) is increased by a desired factor and if the iron loss, especially the eddy-current loss can be made negligibly small in its ratio to the rotor output, it is possible to reconcile an increase of the rotor effective flux Φ and a rise of the rotor speed n.

Of iron losses of a magnetic substance in the case of the rotating magnetization changing at high speed, the eddy-current loss presents a problem. For example, in the case where magnetization is changed along the longer axis of a columnar magnetic piece of a radius $r_0$, letting J, ρ and $k_1$ repsesent magnetization, the resistivity of the magnetic material and a constant, respectively, the eddy-current loss Pd per unit volume can be approximately expressed by the following equation:

$$Pd = k_1 \frac{r_0^2}{\rho} \left( \frac{dJ}{dt} \right)^2 \qquad (6)$$

That is, the eddy-current loss is in proportion to the square of the magnetization changing speed, so that, in the case of a revolving member, the eddy-current loss rapidly increases with a change of the rotating magnetization, i.e. an increase in the revolving speed. Moreover, it is seen that the eddy-current loss is proportional to $r_0^2$ and hence can be markedly decreased by making fine the magnetic material used.

To make the magnetic material fine can be achieved by solidifying a finely powdered magnetic material and an insulating material such, for example, as a synthetic resin into a dust core. In other words, the dust core has an insulator with permeability $\mu_0 = 1$ interposed between particles of the finely powdered magnetic material, and as a consequence, the effective magnetic field is markedly reduced under the action of the reverse magnetic field by the influence of the magnetic pole of each particle, thereby to cause a sharp decrease in the eddy-current loss and, in addition enable the use of the dust core at high flux density.

SUMMARY OF THE INVENTION

An object of this invention is to provide a columnar solid body rotor for DC dynamo electric machines which is capable of high-speed rotation to produce a high output.

Another object of this invention is to increase the effective flux of a columnar solid body rotor.

Still another object of this invention is to increase the volume-conversion permeability of a rotor by the employment of a dust core to produce a high output.

Briefly stated, this invention is directed a rotor for DC dynamo electric machines which has a closely stacked winding occupying most of the volume of the rotor and in which a cylindirical dust core, formed of a finely powdered magnetic material bound with an insulating material such as a synthetic resin or the like, is disposed on the rotor shaft and the closely stacked winding is mounted on the outer periphery of the dust core.

DESCRIPTION OF THE PREFERRED EMBODIMENTS

Figure 2:
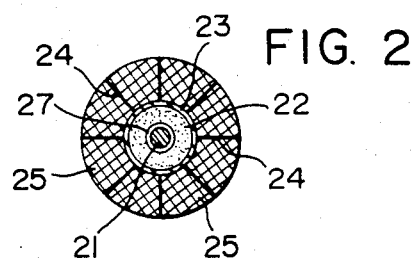
FIGS. 2 and 3 are sectional views respectively showing columnar solid body rotors in accordance with embodiments of this invention.

FIG. 2 illustrates in section an embodiment of this invention. In FIG. 2, reference numeral 21 indicates a rotor shaft; 22 designates a cylindrical dust core; 23 identifies an insulating sleeve-like cylinder; 24 denotes spacers; 25 represent closely stacked windings of the rotor; and 27 shows an insulating layer. The dust core 22 is affixed to the rotor shaft 21 through the insulating layer 27. The insulating sleeve-like cylinder 23 is secured to the dust core 22. The insulating sleeve-like cylinder 23 has mounted thereon the plurality of spacers 24 extending radially of the cylinder. The insulating sleeve-like cylinder 23 and the spacers 24 may also be formed as a unitary structure with each other. Also, it is possible to stick together the insulating sleeve-like cylinder 23 and the spacers 24 with an adhesive which softens at a relatively low temperature and to remove the spacers 24 by heating the assembly after mounting the windings. The closely stacked windings 25 are disposed on the outer periphery of the dust core 22 by utilizing the spacers 24. After the windings 25 are mounted on the dust core 22, the rotor assembly is molded as one body, for instance, by an epoxy resin or the like to provide a columnar solid body rotor.

It is desirable that the insulating sleeve-like cylinder 23, the spacers 24 and the insulating layer 27 are all formed of a heatproof synthetic resin such, for example, as an epoxy resin. The insulating layer 27 immediately outside of the rotor shaft 21 may be dispensed with.

Figure 3:
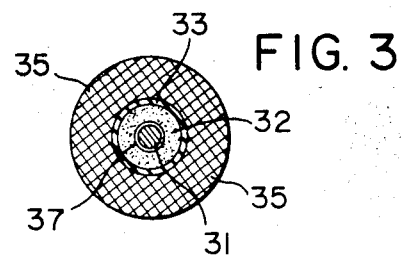

FIG. 3 is a sectional view showing another embodiment of this invention. Reference numeral 31 indicates a rotor; 32 designates a dust core; 33 identifies an insulating sleeve-like cylinder; 35 denotes a closely stacked winding; and 37 represents an insulating layer. The illustrated embodiment corresponds to the structure that the spacers in the embodiment of FIG. 2 are omitted or removed after the mounting of the winding.

The dust cores 22 and 32 in the above embodiments are each produced by binding fine particles of a high purity iron or a magnetic alloy such as an iron base alloy, an iron-nickel base alloy or the like with an insulating material such as a synthetic resin and by the compression forming of the mixture.

As described above, in the columnar solid body rotor of this invention, the cylindrical dust core 22 or 32, which is formed by binding a finely powdered magnetic material with an insulating material such as a synthetic resin, is mounted on the rotor shaft 21 or 31, as depicted in FIG. 2 or 3. Consequently, it is possible to achieve reduced manufacturing cost of the rotor as well as increased rotor output and enhanced rotor control function by increasing the volume-conversion permeability of the rotor several times higher than the space permeability ($\mu = 1$) and making the iron loss negligibly small in its ratio to the rotor output to reconcile an increase in the effective flux of the rotor and its high-speed rotation.

Figure 4:
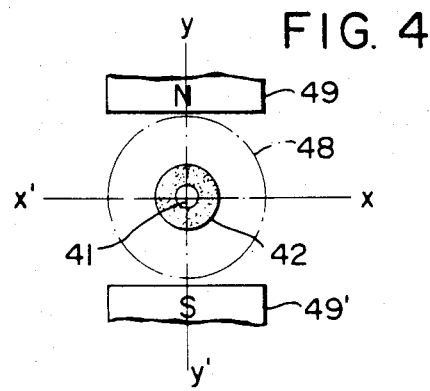
FIG. 4 is explanatory of the magnetic characteristic of a specific operative example of this invention.

Turning next to FIG. 4, a specific operative example of this invention will be described. In this example, the columnar solid body rotor of this invention was produced very small under restrictions of loss analysis means and precision measuring means for various numerical values. The following description will be given in connection with the magnetic performance of the rotor based on measured values and its output and losses in the case where the rotor was operated as a DC motor.

In FIG. 4, reference numeral 41 indicates a rotor shaft; 42 designates a cylindrical dust core; and 48 identifies the rotor of this invention which has a closely stacked winding disposed on the cylindrical dust core. Let it be assumed that the space between the outer periphery of the cylindrical dust 42 and that of the rotor 48 is occupied by the rotor winding. Reference numerals 49 and 49' denote magnetic field poles, each disposed on the outer periphery of the rotor with a space defined therebetween.

The rotor of the present example will be described in connection with the case where fine particles of pure iron, containing epoxy resin as an inclusion, were formed by compression into the cylindrical dust core 42 which had an outer diameter of 0.6 cm, an inner diameter of 0.2 cm, a length of 1.0 cm and a specific gravity of 6.

By way of example, in the case where a magnetic field $H_0$ established between the magnetic field poles 49 and 49' is set at 2,000 [Oe] from the economical point of view, if the magnetic properties of the dust core 42, that is, the magnetic field of the dust core 42, the flux density and the intensity of magnetization are taken as H[Oe], B[gauss] and J[gauss], respectively, the induced magnetization of a magnetic substance in the magnetic field is expressed by the following equation:

$$B = H + 4\pi J [\text{gauss}] \tag{7}$$

Letting the magnetization ratio be represented by X, the intensity of magnetization J is given as follows:

$$J = XH [\text{gauss}] \tag{8}$$

Measurement of the magnetic properties of the dust core showed that the flux density B=8290 [gauss] and that the specific permeability $\mu_s = 4.8$. Accordingly, the magnetic field H in the dust core is 1730 [Oe] because $$H = \frac{B}{\mu_s}.$$

Substituting these numerical values in equations (7) and (8), it follows that the intensity of magnetization J is 522 [gauss] and that the magnetization ratio X is 0.302.

Letting the reverse magnetic field of the dust core 42 be represented by H', $H = H_0 - H'$, so that $H' = -270$ [Oe]. If the coefficient of demagnetization is taken as N, the reverse magnetic field H' is expressed by the following equation:

$$H' = \frac{N}{\mu_0} J \tag{9}$$

Substituting $\mu_0 = 1$ and the aforesaid numerical values in the above equation, N=0.517. The above indicates that the distribution of the flux density on the outer peripheral surface of the dust core 42 is such that the fluxes decrease due to the reverse magnetic field of the dust core in the regions on both sides of the line x—x' in FIG. 4 but spread towards the poles 49 and 49' at a relatively large angle in the upper and lower regions centering about the line y—y'. In other words, the field fluxes converge to the dust core 42 from the poles 49 and 49'.

Moreover, if the effective cross-sectional area of the dust core 42 which is perpendicular to its axial direction and the flux density are represented by a [cm$^2$] and B [gauss], respectively, $\Phi=aB$, so that $\Phi_0$ interlinks, at a rotational angle $2\pi$, the entire rotor winding occupying the space between the outer peripheries of the dust core 42 and the rotor 48 and hence represents the effective rotor flux. In magnetostatic measurement of a rotor using the aforementioned small core, the effective rotor flux $\Phi_0$ was 3316 [Maxwell].

Figure 1:
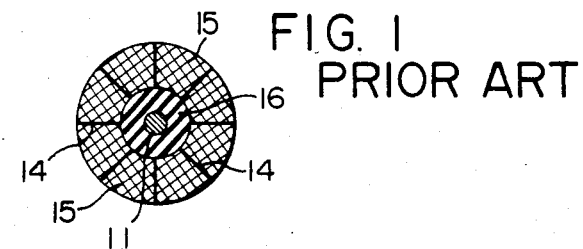
FIG. 1 is a sectional view of a columnar solid body coreless rotor previously proposed.

For the comparison of measured values, the rotor of this inventiion was prepared in which the rotor core was closely wound on the insulating sleeve-like cylinder 23 (33) affixed to the aforesaid small dust core 42 and the distance between both ends of the winding in the axial direction of the rotor was 1.4 [cm] and the number of conductors used was 1,200 (which rotor will hereinafter be referred to as the dust core rotor A), and the coreless rotor of FIG. 1 (hereinafter referred to as the coreless rotor B) was similarly prepared in which its outer diameter and the outer diameter of the insulating sleeve-like cylinder 16 were equal to the outer diameters of the dust core rotor A and the insulating sleeve-like cylinder 22 (33), respectively, and in which the rotor volume, the winding capacity and the number of conductors used were also equal to those of the dust core rotor A. The both rotors were so arranged as to be capable of operating as DC motors. These rotors had rotor shafts and commutators which were each formed of the same material and in the same size, and in measurement, their bearings, brush and its support mechanism were used in common.

The effective rotor flux was calculated backwards from the measured value obtained in the case where the dust core rotor A and the coreless rotor B were each installed between the magnetic field poles of the magnetic field $H_0=2,000$ [Oe] used in the aforesaid magnetostatic analysis and operated as a DC motor. The effective flux of the dust core rotor A was 3,280 [Maxwell] and substantially agreed with the aforesaid magnetostatic measured value, whereas the effective flux of the coreless rotor B was 1,630 [Maxwell]; namely, ½ of that of the dust core rotor A. That is to say, the volume-conversion permeability of the coreless rotor B is equal to the space permeability $\mu=1$, but the volume-conversion permeability of the dust core rotor A is that $\mu=2$.

The winding inductance at the position of the brush in the case of the dust core rotor A was 572 [$\mu$H], and the similar inductance of the coreless rotor B was 339 [$\mu$H]. Accordingly, an increase in the inductance by the dust core is 1.69 times that of the coreless rotor B and remains very small.

An iron loss of 0.09 [W] was obtained by precision measurement of the loss torque in the case where the aforesaid dust core mounted on a magnetic shaft and disposed between magnetic field poles of $H_0=2,000$ [Oe] was driven at 20,000 [rpm] from the outside.

Where a stainless steel shaft (SUS#53 standard) having a diameter of 0.2 [cm] was rotated at 20,000 [rpm] in the same magnetic field as mentioned above, the iron loss of the shaft was 0.09 [W].

In the cases where the dust core rotor A of this invention is driven as a DC motor with the abovesaid dust core and stainless steel shaft disposed between the magnetic field poles of $H_0=2,000$ [Oe], analyzed values shown in the following Table 1 were obtained when a terminal voltage was 16 [V] and the number of revolutions was 20,000 [rpm].

TABLE 1

| Input | Output | Copper loss | Mechanical loss | Dust core iron loss | Stainless steel shaft iron loss |
|---|---|---|---|---|---|
| 4.9 | 3.10 | 0.95 | 0.67 | 0.09 | 0.09 |

The copper loss indicates resistance losses by the rotor winding resistance and the brush contact resistance and the mechanical loss indicates the sum total of bearing friction loss, brush friction loss and wind loss. The short-time rating maximum output of the dust core rotor A shown in Table 1 is 6.3 [W].

In Table 1, the iron loss of the dust core in the high-speed operation of 20,000 [rpm] shows an extremely small value equal to the iron loss of the rotor shaft 0.2 [cm] in diameter which is an indispensable component. The ratio of the iron loss of the dust core to the output 3.1 [W] is only 2.9% and the ratio of the above iron loss to the mechanical loss is also only 13.4%. As to commutation, it was found by the observation of a phenomenon at the time of the number of revolutions being 20,000 [rpm] and the output being 3.1 [W] that since participation of the dust core in the rotor winding was very little, the commutation condition was excellent.

Incidentally, in the case where the magnetic field between the magnetic field poles, the rotor current density and the number of revolutions of the conventional coreless rotor B were the same as those of the abovesaid dust core rotor A, its measured output and input were 1.11 [W], respectively.

Thus, the effective rotor flux of the dust core rotor A of this invention was twice that of the conventional coreless rotor B, so that the torque produced by the dust core rotor of this invention was twice that of the prior art coreless rotor B at the same current density. Moreover, since the ratio of loss torque by the mechanical loss and the iron loss of the rotor shaft to the produced torque of the dust core rotor A was low, the output of the rotor A was about three times that of the conventional coreless rotor B.

According to this invention, the volume-conversion permeability of the rotor increases several times, for example, about 1.2 to 3 times and the effective flux increases, as described above. As to losses of the dust core rotor A and the coreless rotor B produced at the time of the number of revolutions being 20,000 [rpm], since the both rotors were identical in size, winding capacity and current density with each other, they were equal in copper loss to each other, and since the rotor shafts of the both rotors were of the same material and size, the iron losses of the rotor shafts were also equal to each other. Further, as the commutators of the both rotors were of the same material and size and as the same bearings, brush and support mechanism were used in common to the both rotors, the same mechanical losses were obtained by paying attention to their reproducibility.

Accordingly, the difference in loss between the dust core rotor A and the coreless rotor B is only the iron loss by the dust core which is as small as 0.09 [W]. In addition, the effective rotor flux of the dust core rotor A is twice that of the coreless rotor B and the output about three times.

The above has described the effects of this invention based on measured values in connection with an example of the rotor miniaturized due to restrictions of analyzing means for losses and precision measuring means for various numerical values. But the iron loss of the dust core during high-speed rotation remains negligibly small in its ratio to the output even if the rotor is made larger.

The dust core rotor of this invention shown in Table 1 provides an output of 3.1 [W], a maximum output of 6.3 [W] and a mechanical output of 0.016 [sec] and exhibits excellent performance as a rotor of the size of the little finger tip. Moreover, the aforesia numerical values were obtained with the magnetic field set up based on an economical field magnet arrangement.

In view of the cost standards of DC servo motors, the field magnets can be enhanced in quality. In the case of the field intensity being raised, the mechanical time constant is 0.0073 [sec].

The foregoing description given of the effective rotor flux and the rotor inductance based on measurement of one embodiment of this invention and the analyses of losses during high-speed rotation in connection with Table 1 satisfies the requirements of this invention and will facilitate understanding of some of its effects.

Figure 5:
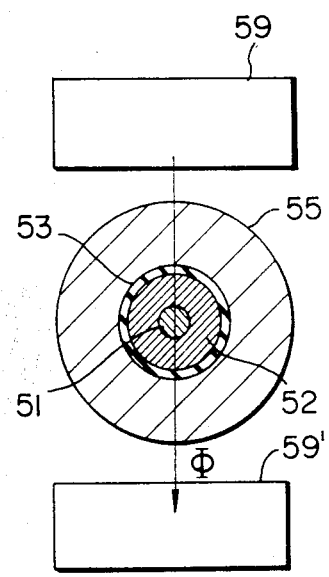
FIG. 5 is explanatory of the ratio between the cross-sectional area of a closely stacked winding and that of a dust core in this invention.

In FIG. 5 illustrating in section the columnar solid body rotor, reference numeral 51 indicates a rotor shaft; 52 designates a dust core; 53 identifies an insulator; 55 denotes a closely stacked winding; and 59 and 59' represent field poles. Letting $d_1$ and $\epsilon$ represent the outer diameter of the conductor forming the winding 55 and the ratio of the winding to the cross-sectional area $A_1$ of the space occupied by the winding (hereinafter referred to as the cross-sectional area $A_1$), respectively, the number of conductors Z and the cross-sectional area $A_1$ bear the following relationship:

$$Z \cdot \frac{\pi}{4} \cdot d_1^2 = A_1 \cdot \epsilon \quad (10)$$

Assuming that the effective length of the closely wound winding 55 in its axial direction and the length of the dust core 52 in its axial direction are constant, the volume ratio between the closely wound winding and the dust core is in proportion to the ratio between their cross-sectional areas. If a permissible current density of the winding is determined by $A_1 \cdot \epsilon$ indicating the winding occupying area, the diameter $d_1$ of the conductor and the upper limit of a permissible temperature rise, a winding current $i_1$ is determined. Provided that the number a of parallel circuits in the rotor is 2, it follows that $2i_1 = Ia$, and the product $Ia \cdot Z$ of the rotor current Ia and the conductor number Z is determined. Since the producet $Ia \cdot Z$ is in proportion to the cross-sectional area $A_1$, if a constant is taken as $k_1$, $k_1 \cdot A_1 = Ia \cdot Z$. Moreover, where the field intensity between the field magnets is made constant, the effective rotor flux $\Phi$ becomes a function of the cross-sectional area $A_2$ of the dust core 52.

Table 2 shows measured values of the outer diameter [mm] and the cross-sectional area $A_2$ [mm$^2$] of the dust core 52. the cross-sectional area $A_1$ [mm$^2$], $A_2/A_1$, the effective flux $\Phi$ [Maxwell] and the output P [W] in the case where the dust core 52 was formed of fine particles of soft iron and a synthetic resin, its permeability was 5.1 to 5.9, the thickness of the insulator 53 of the dust core about 0.6 mm, the length of the dust core 52 in its axial direction 36 mm, and the outer diameter of the entire rotor 10 mm.

TABLE 2

| Outer diameter of core | $A_2$ | $A_1$ | $A_2/A_1$ | $\Phi$ | P |
|---|---|---|---|---|---|
| 7 | 35.343 | 25.73 | 1.374 | 14,000 | 4.85 |
| 6 | 25.133 | 37.825 | 0.665 | 11,000 | 5.57 |
| 5.5 | 20.617 | 43.283 | 0.476 | 9,800 | 6.10 |
| 5 | 16.493 | 48.349 | 0.341 | 8,400 | 5.70 |
| 4 | 9.425 | 57.303 | 0.165 | 5,800 | 4.75 |

Figure 6:
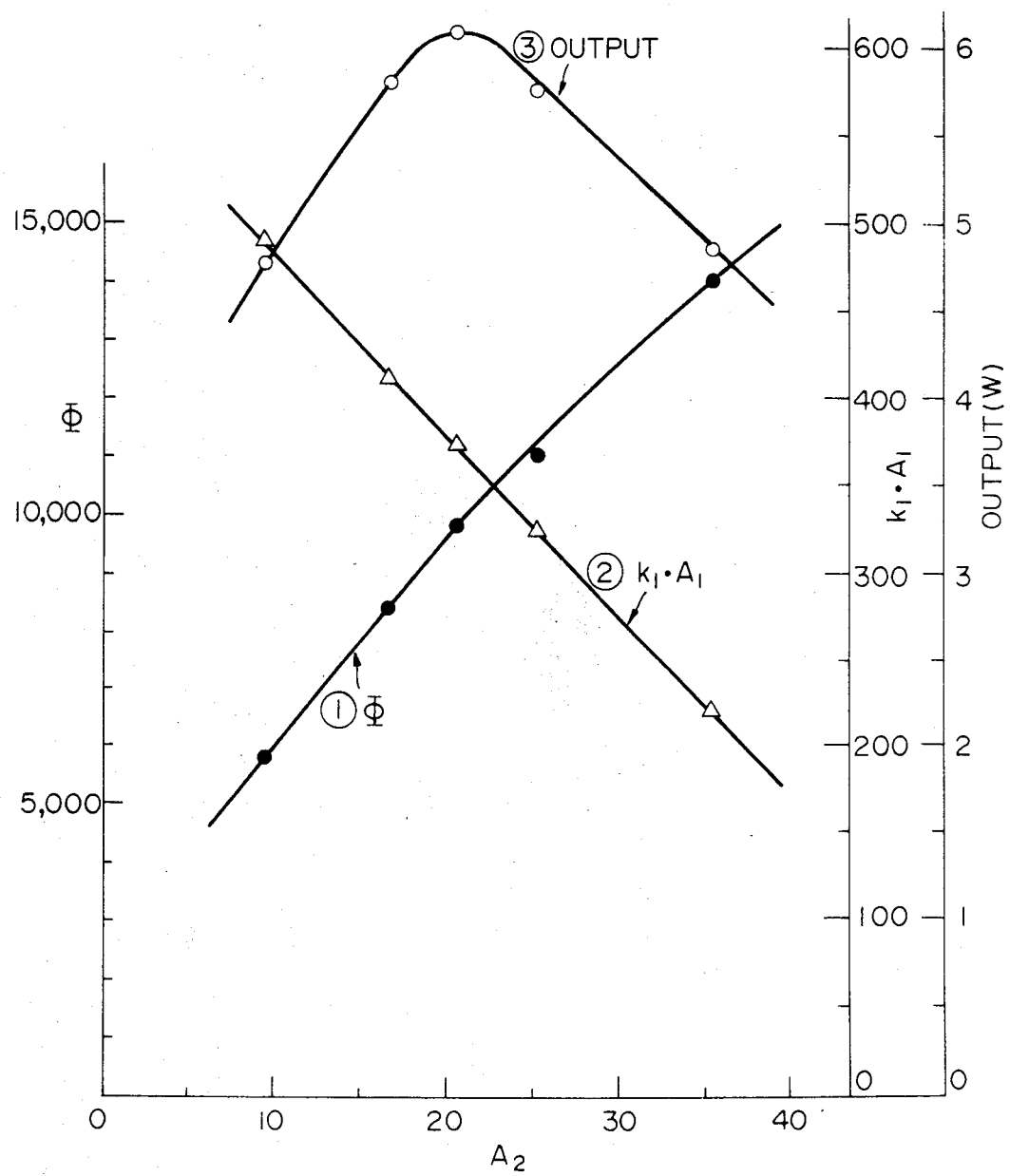
FIG. 6 is a graph showing the effective flux, $k_1 \cdot A_1$ and the output with respect to the cross-sectional area of the dust core in this invention.

In FIG. 6, the effective flux $\Phi$, the $k_1 \cdot A_1$ and the output P are indicated by the curves ①, ② and ③, respectively. The output P in Table 2 and FIG. 6 shows those obtained in the case where the number of revolutions n was 10,000 rpm.

From the abovesaid results, $A_2/A_1$ for providing a maximum output in the case of the same outer diameter of the rotor is 0.476, and $A_2/A_1$ with which about 90% of the maximum output can be obtained is in the range from about 0.3 to 0.7.

Rotors of various sizes different from those mentioned above were also measured and substantially the same results as the abovesaid ones were obtained. That is, the output of the columnar solid body rotor can be increased by selecting the ratio $A_2/A_1$ between the cross-sectional area $A_2$ of the dust core 52 and the cross-sectional area $A_1$ to range from 0.3 to 0.7.

In the columnar solid body rotor of this invention in which a closely wound winding is disposed on the dust core 52, the ratio $A_2/A_1$ between the cross-sectional area $A_2$ of the dust core 52 and the cross-sectional area $A_1$ of the space occupied by the winding is selected to be in the range of 0.3 to 0.7, as described above, whereby the rotor output can be increased without increasing the outer diameter of the rotor. Moreover, since the rotor is a columnar solid body, it is mechanically rigid and very small in the moment of inertia, and since an increase in the winding inductance due to the dust core 52 is slight, the rotor can be driven at high speed. While the foregoing embodiments of this invention have been described as being applied to a DC motor, it is a matter of course that the invention is also applicable to a DC generator.

It will be apparent that many modification and variations may be effected without departing from the scope of the novel concepts of this invention.

What is claimed is:

1. A rotor for d-c dynamo electric machines wherein said rotor is to be rotated at a high speed, has a relatively low loss, low inertia and is mechanically rigid and has an extremely low permeability; said rotor comprising, in combination:

a rotor shaft rotatable around the axis thereof and made of a non-magnetic material;

a cylindrical dust core of small volume compared to the volume of said rotor and symmetrically disposed around said shaft, said cylindrical dust core comprising a hollow cylinder having an outer diameter and having an interior diameter, said interior diameter being fixed to said rotor shaft, the length of said cylindrical dust core being greater than its said outer diameter; said dust core consisting of finely powdered ferromagnetic particles which are bound within and are interspersed within a solid insulation medium, whereby said dust core can have a high flux density while having a small eddy current loss;

insulation sleeve means fixed to and surrounding and electrically insulating said outer diameter of said dust core;

a winding fixed to the outer surface of said insulation sleeve means and closely wound around said dust core and having an outer diameter which encloses a given cross-sectional area which is perpendicular to said rotor shaft;

the volume conversion permeability of said rotor as a whole, including said dust core, said rotor shaft, said winding and said insulation sleeve being at least several times higher than the permeability of free space;

said outer diameter of said dust core enclosing an area $A_1$ which is perpendicular to the axis of said rotor shaft and wherein said given cross-sectional area enclosed by said winding is an area $A_2$; the ratio of $A_2/A_1$ being in the range of 0.3 to 0.7.

2. The rotor of claim 1 wherein said insulation sleeve means has a plurality of spacers extending radially therefrom which are parallel to the axis of said rotor; said closely wound winding being disposed between adjacent ones of said spacers.

3. A rotor for d-c dynamo electric machines wherein said rotor is to be rotated at a high speed, has a relatively low loss, low inertia and is mechanically rigid and has an extremely low permeability; said rotor comprising, in combination:

a rotor shaft rotatable around the axis thereof and made of a non-magnetic material;

a cylindrical dust core of small volume compared to the volume of said rotor and symmetrically disposed around said shaft, said cylindrical dust core comprising a hollow cylinder having an outer diameter and having an interior diameter, said interior diameter being fixed to said rotor shaft, the length of said cylindrical dust core being greater than its said outer diameter; said dust core consisting of finely powdered ferromagnetic particles which are bound within and are interspersed within a solid insulation medium, whereby said dust core can have a high flux density while having a small eddy current loss;

insulation sleeve means fixed to and surrounding and electrically insulating said outer diameter of said dust core;

a winding fixed to the outer surface of said insulation sleeve means and closely wound around said dust core and having an outer diameter which encloses a given cross-sectional area which is perpendicular to said rotor shaft;

the volume conversion permeability of said rotor as a whole, including said dust core, said rotor shaft, said winding and said insulation sleeve being at least several times higher than the permeability of free space;

said volume conversion permeability of said rotor being in the range of 1.2 to 3.0.

4. The rotor of claim 3 wherein said volume conversion permeability of said rotor is in the range of 1.2 to 3.0.

5. The rotor of claim 3 wherein said insulation sleeve means has a plurality of spacers extending radially therefrom which are parallel to the axis of said rotor; said closely wound winding being disposed between adjacent ones of said spacers.

6. The rotor of claim 4 wherein said insulation sleeve means has a plurality of spacers extending radially therefrom which are parallel to the axis of said rotor; said closely wound winding being disposed between adjacent ones of said spacers.

* * * * *